Nov. 19, 1940.                S. N. MESJIAN                2,222,297
OBJECTIVE DEFINING DEVICE
Filed April 20, 1937
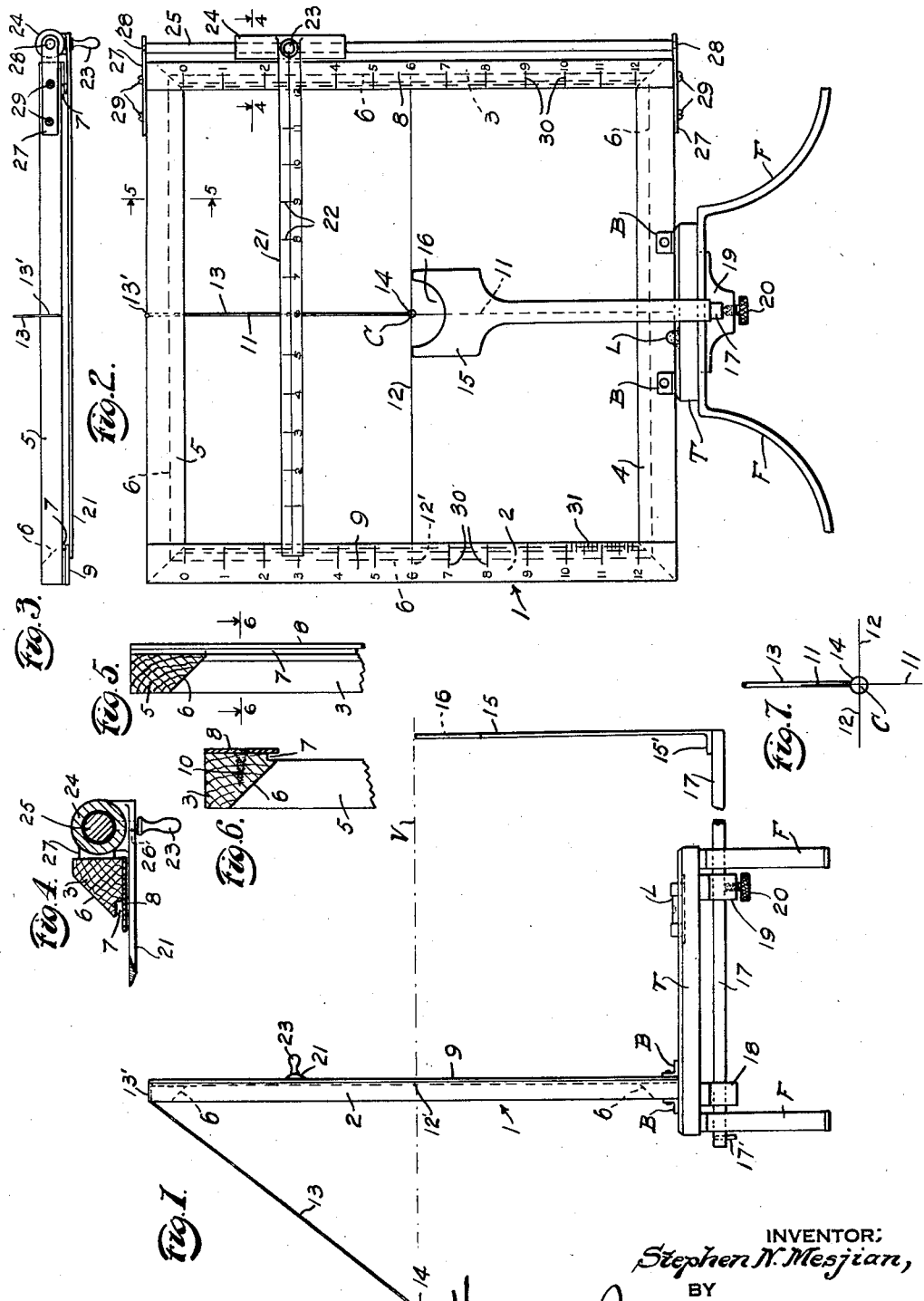
INVENTOR:
Stephen N. Mesjian,
BY
Harold D. Penney,
ATTORNEY.

Patented Nov. 19, 1940

2,222,297

UNITED STATES PATENT OFFICE 2,222,297

OBJECTIVE DEFINING DEVICE

Stephen N. Mesjian, New York, N. Y.

Application April 20, 1937, Serial No. 137,933

2 Claims. (Cl. 33—64)

The present invention relates to an improvement in a sighting frame for use by artists to aid in delineating perspective drawings, by free hand, from objects or natural scenes or objects, and has for its principal object the provision of a semi-mechanical means whereby an artist may sight the object or scene in its proper proportional aspect, through the device and thus obtain, in desired reduced dimensions and values, the proper relations and proportional dimensions of all objects within the sighting scope of the sighting device.

Means are also provided for reducing or amplifying the field of the scene and surroundings, as desired, so as to include, or exclude, any part of the composition of the scene as viewed through the device, thus giving the artist wide latitude in the selection of details of the composition of the picture, as to the back and foregrounds, skylines and horizons.

The device further assists the artist in obtaining and depicting the scene before him with great rapidity and accuracy.

The foregoing, and other objects will appear as the herein description proceeds and it will be obvious that modifications may be made in the details herein without departing from the spirit hereof or the scope of the claims.

In the drawing,

Fig. 1 is a side view of the device;

Fig. 2 is a front elevation thereof;

Fig. 3 is a plan view of the sighting frame;

Fig. 4 is a fragmentary sectional view taken on line 4—4, Fig. 1 looking in the direction of the arrows;

Fig. 5 is an enlarged fragmentary sectional view, taken on the line 5—5, Fig. 2, looking in the direction of the arrows;

Fig. 6 is an enlarged fragmentary sectional view taken on the line 6—6, Fig. 5, looking in the direction of the arrows;

Fig. 7 is an enlarged, fragmentary view, showing the sighting cross-wires and the centering rod in normal axial alinement, to fix the central line of vision of the area, object or scene being viewed and sketched.

The device comprises a preferably rectangular frame, generally denoted by 1, made of suitable material such as wood, the frame comprising four strips 2, 3, 4 and 5 fixed together at their connecting corners. All of the strips are beveled, or angled, outwardly, at their rear inner edges, as at 6, Figs. 1 to 6 inclusive, thus forming beveled planes that are substantially in plane with the line of vision through the frame, on all four sides.

The two side strip uprights 2 and 3, as in Figs. 2, 4 and 6 are each faced with a steel index scale 8 and 9, respectively, held thereto by suitable screws 10, Fig. 6, the inner edges of the scales cooperating with the kerfed inner edges of the said uprights, by their overhang, to form vertical rabbets 7, Figs. 3, 4, 5 and 6. When it is desired to reduce the area of vision within the enclosing frame 1, a cut-out mask of suitable thin material, not shown, with the inner area cut-out to desired dimension and contour, may be slid into said slots, thus to reduce the area envisioned therethrough, and also where desired, to reduce or amplify the foreground or skylines.

As in Figs. 1 and 2, the frame is rigidly mounted, in vertical position, upon a base or table T, by means of angle fastening means B—B. The table T is provided with four legs F, one at each corner thereof, the table being rectangular in plan.

A spirit level L is mounted upon the upper, horizontal face of the table, to aid in setting the viewing axis horizontally, as indicated at V, Fig. 1, by dot and dash lines.

At the central portion of the underside of the table T, as viewed in Fig. 2, are located two alined slide bearings 18—19, Fig. 1, these being suitably and fixedly held in operative axial alinement with each other and to the table.

In the bearings is slidably mounted a square slide bar 17, at the outer exposed end thereof of which is fixedly and vertically mounted a sighting means 15, the upper end of which is provided with a semi-circular sight opening 16, the center of the radius C, Fig. 2, of which is coincident with the sight axis V, Fig. 1. The sighting means 15 is affixed to slide bar 17 by a riveted angle footing 15'. The sight slide bar 17 is locked in desired adjustable position by means of a lock screw 20, located in bearing 19, and the bar is stopped at its outermost position by a stop pin 17', Fig. 1, by the outer face of bearing 18.

As in Figs. 2, 3, and 4 the vertical frame forming strip 3, has located parallel with its outer edge a fixed vertical slide bar 25, of cylindrical cross-section, the same being held in fixed non-rotatable position at its opposed reduced ends 28—28 in bracket plates 27—27, suitably mounted to the top and lower edges of the frame, by screws 29—29, Fig. 2.

Upon the vertical slide bar 25, is slidably held a slide bearing 24, which may be lockable to said bar 25 by a thumb operated set screw 23, flanged at 21 and carried by slide 24, Figs. 1 and 2, or the slide may be frictionally mounted.

The slide 25 has affixed permanently thereto on its face which is level with the plane of the front of the frame, Fig. 4, an indexed steel rule or scale 21, which spans, horizontally, the open area between the side frame strips 2 and 3 and overlaps the two vertical indexed scales 8 and 9. The rule or scale 21 is centrally indexed at "6," and the indices thereon run from left to right, and viewed in Fig. 2 from "1 to 12."

Scale 21 is movable, and settable at any position between the upper and lower frame strips 4 and 5, and coordinates with the vertical scales 8 and 9 to give the correct position of any point within the field of vision within the frame and the relative proportions of any object and as the scale 21 is moved up or down it indicates by cooperation with the vertical scales the correct position and length of any line, horizontal, vertical or oblique.

As the drawing progresses, the scale 21 may be moved, as desired and by cross reading of the three scales a very correct delineation of the scene encompassed within the frame area may be made, in any desired reduced or modified proportion.

In conjunction with the frame encompassed area, and the movable and fixed scales, there is also provided a pair of sighting cross wires 11 and 12, these wires being permanently stretched and fixed to the opposed pairs of frames so that said wires cross at the central axis C of the frame, Fig. 2, thus dividing the frame area into four equal sections. These four sections divide the larger area into four smaller areas, of equal proportion, and further define, for greater accuracy, the location of objects or details of scenic composition.

At the rear of the device, Fig. 1, and anchored at 13' to the top of upper frame 5, is an angularly and rearwardly disposed stiff wire rod 13, the lower end of which is tipped with a ball end 14, of relatively small diameter.

As disclosed, the ball 14, the intermediately disposed axis C of the cross wires 11 and 12, and the axis of the semi-circular sight opening 16, of the horizontally movable, vertically arranged sight member 15, are all in horizontal or vertical alinement with each other within the central sighting axis V, Fig. 1, and as shown in the enlarged, fragmentary axial view, in Fig. 7.

With the device set up, as in Fig. 2, the slide eye-piece sight 15 having been located and locked, the scene is then ready to be viewed along the central axis, and the axis is viewed by one open eye, the other being closed, and as viewed this immediately sets the position of the central objective of the picture and the viewer then depicts the scene before him upon his sketching surface, in reduced ratio, using the movable scale and fixed sighting devices as he progresses.

The adjustment to and fro, of the sighting eye piece, naturally increases the angle of vision of the picture area or scene, when the eye piece is moved towards the frame, and decreases or narrows the angle of vision of the area being viewed, when the eye piece is moved away from the device.

The sketching surface area upon which the artist depicts the scene before him may be provided with lines and indexes corresponding to the vertical and horizontal and vertical scales but of reduced proportions and values, and thus aid in the relative and proper positioning of the components of the pictured area.

From the foregoing it will be noted that the device herein described, enables the artist to easily define distance, masses details, relative proportions and positions of components of the pictured area, and also to select the composition and its relative dominance of the portions of the picture desired, enables him to increase or decrease angle of vision, thus to alter the field, to change the relative proportions of the horizontal lines and skylines, distances and foregrounds, and generally, to definitely select from the scene before him, the artistic features and details thereof, and to hold the areas thus selected, until the artist has completed the picturization thereof.

Having thus described the invention what is claimed is:

1. An objective view defining device for artists' use comprising a rectangular upright frame comprising index-scale-carrying horizontal and vertical frame members and means defining a sighting point near the central point of the plane of said frame; and eye locating and sighting means mounted on said device; the inner faces of said vertical members being provided with opposed rabbets to receive therein an apertured mask.

2. An objective view defining device for artists' use comprising a base; a rectangular vertical frame mounted upon said base; sighting cross wires mounted upon opposite sides of said frame dividing the area thereof into plural sub-areas and defining a central point within the plane of said frame; an eye-piece sighting device parallel to said plane and having a semicircular cut-out in its upper part and movably supported relative to said cross wires so that the center of the cut out is in a line perpendicular to said central axis point said center locating a sighting point; a sighting point fixedly mounted on said device, in alinement with said center and said central point; the vertical sides of said frame being provided with fixed indexed scales; the inner faces of said vertical sides being provided with opposed rabbets to receive therein an apertured mask; a cylindrical rod mounted in spaced parallel relation with the outer face of one vertical side; a slide bearing frictionally slidably and rotatably mounted on said rod; a movable horizontal indexed scale fast on said bearing and traversing said fixed scales, the frictional mounting of the bearing allowing said scale to be movable toward and from, and up and down, the front plane of the frame; and means for locking said movable scale in adjusted position.

STEPHEN N. MESJIAN.